(12) United States Patent
Marchak, Jr. et al.

(10) Patent No.: US 10,582,191 B1
(45) Date of Patent: *Mar. 3, 2020

(54) DYNAMIC ANGLE VIEWING SYSTEM

(71) Applicant: ALIVE 3D, Calabasas, CA (US)

(72) Inventors: Raymond Paul Marchak, Jr., Calabasas, CA (US); Russell Neil Harlan, Jr., Lancaster, PA (US); Hunter Laux, Santa Barbara, CA (US)

(73) Assignee: ALIVE 3D, Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,361

(22) Filed: Feb. 4, 2019

Related U.S. Application Data

(63) Continuation of application No. 16/059,863, filed on Aug. 9, 2018, now Pat. No. 10,271,040.

(51) Int. Cl.
| | |
|---|---|
| *H04N 13/279* | (2018.01) |
| *B29C 64/393* | (2017.01) |
| *G06T 13/40* | (2011.01) |
| *G06T 19/20* | (2011.01) |
| *G06T 7/292* | (2017.01) |

(Continued)

(52) U.S. Cl.
CPC ......... *H04N 13/279* (2018.05); *B29C 64/393* (2017.08); *B33Y 50/00* (2014.12); *G01S 17/89* (2013.01); *G06K 9/00671* (2013.01); *G06T 7/292* (2017.01); *G06T 7/70* (2017.01); *G06T 13/40* (2013.01); *G06T 17/20* (2013.01); *G06T 19/20* (2013.01); *H04N 13/243* (2018.05)

(58) Field of Classification Search
None
See application file for complete search history.

(56) References Cited

U.S. PATENT DOCUMENTS

| | | |
|---|---|---|
| 2006/0290695 A1 | 12/2006 | Salomie |
| 2015/0346812 A1 | 12/2015 | Cole et al. |
| 2018/0012370 A1* | 1/2018 | Aghamohammadi .. G01S 17/89 |

OTHER PUBLICATIONS

De Abreu et al, "Optimal layered representation for adaptive interactive multiview video streaming", J. Vis. Communication Image R. 33, pp. 255-264, 2015. (Year: 2015).*

(Continued)

*Primary Examiner* — Kee M Tung
*Assistant Examiner* — Patrick F Valdez
(74) *Attorney, Agent, or Firm* — ARC IP Law, PC; Joseph J. Mayo

(57) ABSTRACT

A system that generates a 3D environment from data collected by depth sensors (such as LIDAR) and color sensors (such as color video camera data) observing an area or activity, transmits versions of the 3D environment to various devices for display, and enables device users to dynamically alter a viewing angle of the 3D environment. The version of the 3D environment sent to each device may be optimized for the device's resolution and for the bandwidth of the connection to the device. Embodiments may enrich the 3D environment by detecting and tagging objects and their locations in the environment, and by calculating metrics related to motion or actions of these objects. Object tags and metrics may be transmitted to devices and displayed for example as overlays of images rendered from user-selected viewing angles. Embodiments of the system also enable 3D printing of an object as a memento for example.

27 Claims, 11 Drawing Sheets

(10 of 11 Drawing Sheet(s) Filed in Color)

(51) Int. Cl.
*B33Y 50/00* (2015.01)
*G06K 9/00* (2006.01)
*G06T 7/70* (2017.01)
*H04N 13/243* (2018.01)
*G01S 17/89* (2020.01)
*G06T 17/20* (2006.01)

(56) References Cited

OTHER PUBLICATIONS

Lou, et al., "A Real-Time Interactive Multi-View Video System", MM'05, Nov. 2005.

* cited by examiner

DYNAMIC ANGLE VIEWING SYSTEM

This application is a continuation of U.S. Utility patent application Ser. No. 16/059,863 filed Aug. 9, 2018, issued as U.S. Pat. No. 10,271,040, the specification of which is hereby incorporated herein by reference.

BACKGROUND OF THE INVENTION

Field of the Invention

One or more embodiments of the invention are related to the fields of visualization, data processing systems and communication systems. More particularly, but not by way of limitation, one or more embodiments of the invention enable a dynamic angle viewing system that enables users to dynamically alter a viewing angle of a 2D or 3D video and view the video on various electronic devices with varying resolutions and over various networks with varying bandwidths. One or more embodiments of the system also enable a novel storage structure and delivery system for 2D or 3D viewing along with object annotations and metrics that can be viewed from any angle. One or more embodiments of the system also enable color 3D printing of an object as a memento for example.

Description of the Related Art

Systems to generate 3D models of a scene and to render these scenes from different angles or viewpoints are known in the art. Examples include systems used by studios to generate virtual reality content, and virtual reality headsets that render this content from an angle or viewpoint corresponding to the pose of the headset. A potential limitation of these system is that generation of a virtual reality model is typically time-consuming and labor-intensive. In particular, this generation process cannot generally be used in real time or with minimal manual input to create a 3D model representing a live action scene, such as a sport competition. In addition, specialized hardware is required for virtual reality headsets, and a user must wear the headset and move his or her head to see a scene from a different angle.

3D movies are also known in the art, but these 3D movies are typically generated as stereoscopic images from a specific viewpoint determined by the location and orientation of the camera or cameras capturing a scene. Even 3D movies consisting of completely computer-generated content are typically rendered from a specific viewpoint for each shot, rather than allowing the viewer to choose a viewpoint.

3D graphics systems existing in the art that enable users to manually generate a 3D model and to view this model from any viewpoint. Examples include Computer Aided Design (CAD) systems. These models are typically static rather than dynamic. In some situations, 3D models may be created from sensor data such as LIDAR scans, but in these situations considerable manual effort is typically required to generate a final, usable 3D model. Moreover, the scans are typically a snapshot of an object or scene at a moment in time, rather than a time sequence of scans that is converted to a dynamic 3D environment.

There are no known systems that generate a 3D model of a scene or action in real time or with minimal manual labor, that transmit this 3D model to widely available consumer devices such as televisions or phones, and that enable users of these consumer devices to view the 3D model from different viewing angles. There is a need for a system that can effectively function like broadcast or on-demand television for events, but that broadcasts or streams 3D models instead of flat 2D video taken from one or a limited number of viewpoints. Since different devices have different display capabilities and different network connections, there is a need for a system that also adapts the 3D model transmitted to each device to these device capabilities and connection characteristics. There are no known systems that automatically or with minimal labor enrich a 3D model of a scene or action with data such as object identities and metrics on object motions or actions, and that transmit this data to devices for display. There are also no known systems that enable a device user to receive and view a 3D model of a scene, select an object in that scene, and transmit 3D data for the object to a 3D-printer to create a physical 3D representation of the object, for example as a memento.

For at least the limitations described above there is a need for a dynamic angle viewing system.

BRIEF SUMMARY OF THE INVENTION

One or more embodiments described in the specification are related to a dynamic angle viewing system. Specifically, one or more embodiments of the invention may generate a 3D environment representing a time sequence of color 3D models of an area and transmit data from this environment to devices that may render the environment from any desired viewing angle.

One or more embodiments may include or connect to multiple depth sensors, such as LIDARs for example, and multiple color sensors, such as color 2D video cameras, for example. These sensors may be oriented around a common area, such as for example field, studio, set, or stadium. A computer or network of computers or processors may obtain depth data from the depth sensors, obtain color data from the color sensors, and transform the data into a 3D environment that represents the area. This process may be repeated at multiple times or time intervals, resulting in a sequence of records in the 3D environment that represent the area over time, each record corresponding to a different time or time interval. Illustrative steps for this transformation may include: synchronizing the data from different sensors to a common time scale; transforming depth data to a common coordinate system using the location and orientation of each depth sensor; merging the transformed depth data into combined depth data, such as for example a point cloud with points from all depth sensors; generating a mesh based on the combined depth data; and calculating colors for the vertices of the mesh based on color data from the color sensors. Vertex color may for example be calculated by projecting the vertex onto an image plane associated with a color sensor, where the image plane pose in the common coordinate system is based on the location and orientation of the color sensor. The mesh and associated color data may be combined into a record of the 3D environment at a point in time or over a specified time interval. Multiple such records over time may be included in the 3D environment, resulting in a dynamic 3D environment that represents both static items and moving items over time. The 3D environment may be stored in a memory connected to or accessible to the computer. The computer may receive requests to playback the 3D environment from two or more devices. Each device may for example transmit a request that includes the device's resolution and the bandwidth of a network connection between the computer and the device. The computer may use this transmitted information to configure a transmission that is appropriate for each device. For example, the computer may select an initial record in the 3D environment for transmission to a device, and calculate a device-specific mesh from the mesh associated with that initial record. Two different devices may receive different initial records, or they may receive the same initial record, depending for example on when they request playback and what playback parameters they requested. The device-specific mesh may be based for example on one or both of the resolution of the device and the bandwidth of the connection to the device. Devices with lower resolution or lower bandwidth connections may for example receive smaller or lower fidelity meshes than devices with higher resolution or higher bandwidth connections. The computer may also calculate and transmit device-specific subsets of color data corresponding to the device-specific meshes and to the device and connection characteristics. Different devices may request transmissions at different times and may receive initial data from the computer at different starting times. After the starting time of the first transmission to a device, the computer may send one or more subsequent transmissions that include changes to the device-specific mesh after the starting time.

In one or more embodiments, a receiving device may enable a user to view the received mesh and colors from a different viewing angle, without a communication to the computer to receive new data corresponding to the different viewing angle. When the user wants to change a viewing angle, the device may render the previously received mesh and colors to an image that corresponds to the new viewing angle and display this rendered image.

In one or more embodiments, one or more of the depth sensors may be or may include a LIDAR. In one or more embodiments, one or more of the color sensors may be or may include cameras, 2D video cameras, or at least one 3D camera.

In one or more embodiments the computer may receive a dynamic update to the bandwidth of the connection to a device after the first transmission to that device. It may then calculate an update to the device-specific mesh based on the new bandwidth and transmit that update to the device.

One or more embodiments may synchronize depth and color data from the sensors based on a common clock. Instead of or in addition to using a common clock, one or more embodiments may synchronize sensor data based on observations by the sensors of a common event that occurs in the area being observed. The sensors may have or may access audio sensors for example, that record a common event that makes a sound. One or more embodiments may adjust the time of observation of a sound event by an audio sensor based on the distance between the location of the sound event and the location of the audio sensor.

In one or more embodiments the colors associated with the vertices of a mesh may include one or more 2D images representing a texture, and texture coordinates associated with the mesh vertices.

In one or more embodiments the computer may also detect one or more objects in the area. Detection may be based on the color data from the color sensors, for example using object recognition algorithms applied to 2D color images. The computer may assign an identity to each detected object and determine a location in the mesh for each detected object. The object identities and locations in the mesh may be sent to the receiving devices with the initial transmissions to those devices. Subsequent transmissions to the devices may for example transmit updates to object locations.

In one or more embodiments, one or more receiving devices may be enabled to send data from a received mesh to a 3D printer, for example to create a 3D representation of the area or a portion of the area. For example, a user may request to 3D-print one or more of the objects identified by the computer and transmitted to the device. In response, the device may obtain a mesh representing or containing these one or more objects and transmit command to a 3D printer that correspond to this mesh. The mesh for the one or more objects may be calculated locally by the device, or the device may request this mesh for the one or more objects from the computer. If the device has received a relatively low fidelity mesh from the computer (for example because the device has a low resolution or a low bandwidth connection), it may request a high fidelity or lower compression mesh from the computer to use for 3D printing a high-resolution version of the one or more objects.

In one or more embodiments, the user may be able request the device to 3D-print a colored item, or to send coloring commands to another coloring device that colors the item created by a 3D printer. The device may obtain colors for the mesh vertices corresponding to the one or more objects the user wants to 3D print. As with the mesh for the object or objects, the device may either obtain these mesh vertex colors locally from the color data that has been received, or it may request mesh vertex color data from the computer, potentially at a higher fidelity or lower compression than the color data that has been received.

In one or more embodiments the computer may calculate one or more metrics associated with one or more of the identified objects. Metrics may include for example, without limitation, speed, velocity, acceleration, angular velocity, angular acceleration, distance traveled, and a count of the number of times an object or group of objects has performed an action. Metrics may be calculated based on the object locations in the mesh associated with the 3D environment. Metrics may be sent to a device as part of the initial transmission, and changes to metrics may be sent as part of subsequent transmissions.

In one or more embodiments, a receiving device may overlay received object identities and metrics onto displayed images. The device may also allow the user to view the received mesh and colors from a different viewing angle, without a communication to the computer to receive new data corresponding to the different viewing angle. When the user wants to change a viewing angle, the device may render the previously received mesh and colors to an image that corresponds to the new viewing angle, overlay the object identities and metrics, and display this rendered image with the overlays.

In one or more embodiments, either or both of the computer and the receiving device may be able to modify meshes or colors to insert content or highlight content. The content may correspond for example to one of the identified objects. For example, a device may enable a user to select an object to highlight, and it may modify the received mesh or colors to highlight this object on the rendered and displayed image. In one or more embodiments the content to insert or highlight may correspond to an advertisement. Transforming of the mesh or colors to highlight content may for example change one or more of a size, shape, and color of one or more items in the received mesh. In one or more embodiments the content may correspond to a 3D avatar, such as an avatar representing a device user.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein.

DETAILED DESCRIPTION OF THE INVENTION

A dynamic angle viewing system will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
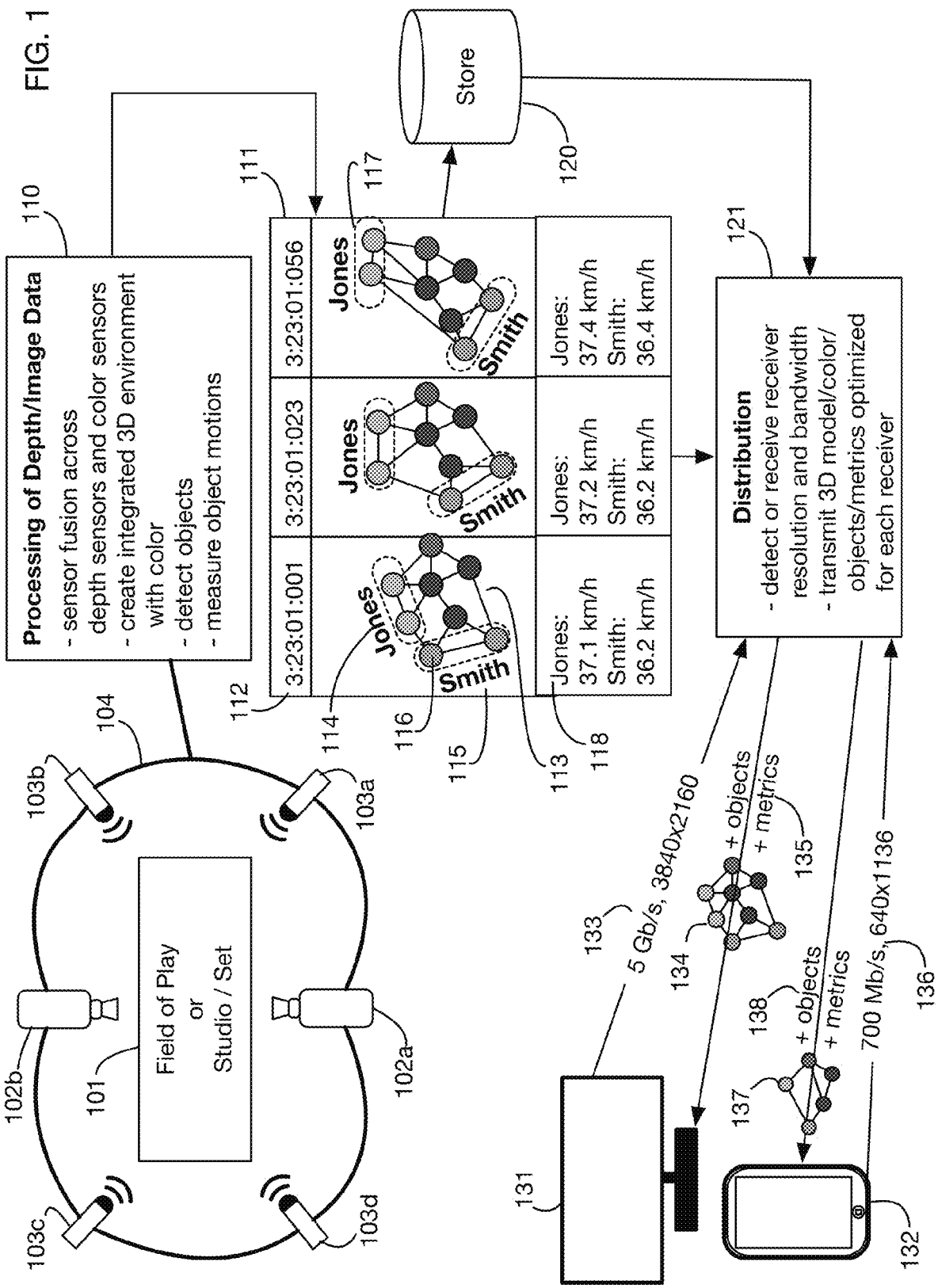
FIG. 1 shows an architectural diagram of an embodiment of a dynamic angle viewing system, illustrating processing of depth and color data to form a 3D environment and distribution of this 3D environment optimized for different devices and networks.

FIG. 1 shows an architecture diagram of an illustrative embodiment of the system. The system creates a 3D record of activity or objects in a field of play, studio, set, or other area 101. For example, without limitation, area 101 may be an arena, a stadium, a court, a gymnasium, a playing field, a pool, a track, a site for any sports activity, a movie set or studio, a television set or studio, a public space, a private space, a room, a home, a building, a suite, a meeting hall, a government building, a theater, or a music hall. In one or more embodiments the area 101 may change over time; for example, a 3D record may be made of a bike race by following the riders through the course. Traditionally activity or objects in area 101 may for example be captured with one or more 2D video cameras. One or more embodiments of the invention may create instead a full 3D model of the area 101 and the activity within it. This 3D model may for example be transmitted to viewers who may be able to rotate views or change viewpoints to see the activity from any angle or viewpoint.

Data may be captured from area 101 using one or more sensors. Sensors may include for example depth sensors, which may measure the 3D geometry of the area and objects within it, and color sensors, which may measure the color of the area and objects within it. The illustrative embodiment shown in FIG. 1 captures data from two color sensors 102a and 102b, and four depth sensors 103a, 103b, 103c, and 103d. One or more embodiments may include one or more of the sensors; one or more embodiments may not include sensors but may for example process data received from the sensors.

In one or more embodiments, captured sensor data may be recorded for example using Robot Operating System (ROS) software. The data format of the captured data may be for example a ROS bag file, which provides a capability to record disparate sensor data in a single file. The ROS bag file may also provide a timestamp associated with the data from each sensor.

Depth sensors may be any type or types of device that measure aspects of the 3D location or 3D shape of objects. Illustrative technologies used in depth sensors may include for example, without limitation, LIDAR, ultrasonic, stereoscopic cameras, 3D cameras, 4D cameras, photogrammetry, structured light, and modulated light with phase detection. An illustrative LIDAR that may be used in one or more embodiments is a Velodyne PUCK™ (VLP-16) sensor. One or more embodiments may combine data from sensors with different depth sensing technologies.

Color sensors may be any type or types of device that measure aspects of the color or colors of objects. A color sensor may be a camera, including for example a 2D camera, a 3D camera, a stereoscopic camera, and a 4D camera. Cameras may be video cameras or still cameras. An illustrative camera that may be used in one or more embodiments is a Basler® AG 2D video camera.

In one or more embodiments, some or all of the depth and color sensors may be integrated into one or more devices that measure both color and depth. For example, in FIG. 1, color sensor 102a and depth sensor 103a may be integrated into a single device. An illustrative device combining depth and color sensors that may be used in one or more embodiments is the BrashTech® 3D Flash LIDAR system.

One or more embodiments may receive or capture additional data from other types of sensors or components, and may use this additional to process or augment the depth and color data. For example, in one or more embodiments, objects in a scene may have attached locator devices that transmit the location of each individual object. Objects may have identification tags attached, such as for example RFID tags or barcodes, which may also assist in locating individual objects. This data may be used for example to assist object tagging in a 3D environment, as described below. One or more embodiments may for example access radar information to assist in determine the velocities of objects. One or more embodiments may access inertial sensor data from inertial sensors attached to objects, to assist in measuring the motion of these objects.

Embodiments may receive data from any desired number of depth sensors and color sensors. In some environments it may be desirable to have multiple depth sensors and multiple color sensors positioned at different locations and orientations around area 101, in order to capture objects and activity across the entire area. Multiple sensors may also provide additional information when one object in area 101 occludes another object when viewed from only one viewpoint.

Data from sensors 102a, 102b, 103a, 103b, 103c, and 103d may be sent to, received by, or retrieved by a processor 110. Processor 110 may be for example, without limitation, a server, a computer, a desktop computer, an embedded processor, a laptop computer, a GPU, a notebook computer, a tablet, a phone, or combinations or networks of several of these devices. Data may be transferred from sensors to the processor 110 over any network or link. In the embodiment shown in FIG. 1, network 104 connects the sensors to one another and to the processor. Network 104 may use any desired topology and technology. In one or more embodiments network 104 may be wireless, wired, or a combination thereof.

Processor 110 may perform any or all of the following processing steps to transform sensor data into an integrated 3D environment: fusion of data from the various sensors, for example to obtain both 3D geometry and color for the objects in area 101; creation of an integrated 3D environment for the area, which represents both the geometry and color; detection of objects in the area; and measurement of certain aspects of the motion of one or more objects. These steps are described in more detail below.

The output of these steps is a 3D environment 111. The 3D environment is dynamic because it may include records of the 3D environment over time. Each record may be associated with a particular time or time slice. Each record may contain a representation of the 3D geometry and color of the area 101 and objects in area 101 at a particular time or time slice. Conceptually, one or more embodiments may represent the 3D geometry in each record as a 3D mesh, for example. This format is illustrative; one or more embodiments may use any desired representation, data structure, or format. In one or more embodiments some or all of the data representations may be compressed, using either lossy or lossless compression.

For example, the 3D environment record associated with time 112 includes mesh 113. In FIG. 1, this mesh 113 is shown as a small set of vertices connected by a small number of edges for ease of illustration. It is also shown in 2D for ease of illustration. Actual meshes used in one or more embodiments may be 3D meshes (such as for example representations of surfaces in 3D as triangles or other polygons), and they may contain thousands or millions (or more) of vertices and edges.

In one or more embodiments the records of the 3D environment 111 may also include color information obtained from color sensors (such as cameras). The color information for the record of 3D environment 111 at time 112 is represented in FIG. 1 as a color associated with each vertex of mesh 113. For example, vertex 116 in mesh 113 has color green. One or more embodiments may use other representations for color. For example, colors associated with mesh vertices may be represented as a texture image, and the color representation may include this texture image and texture coordinates into the texture image for each vertex. In one or more embodiments a texture image may be further processed, for example to remove redundancy (which may occur in textures with repeated patterns). Vertex colors, texture images, or any other color representations may use any desired color space.

In one or more embodiments the 3D environment 111 may also include identification of one or more objects in area 101. Object identities may be either generic (such as "player," "quarterback", "football", "man", "dog") or specific to refer to individual persons or other named items. Object identities may also identify parts of other objects, such as "quarterback's arm" for example. Objects that are identified may be associated with one or more vertices or edges in the mesh. For example, in 3D environment 111, two objects 114 and 115 have been identified. These objects are associated with specific vertices; for example, vertex 116 is associated with object 115.

In one or more embodiments, object locations may be tracked over time. This may be represented for example as changes in the vertices associated with an object or changes in the positions of those vertices. For example, in 3D environment 111, object 114 moves to location 117 in the third record shown. By tracking and analyzing changes in object positions over time, one or more embodiments may calculate one or more metrics associated with an object or with any part of an object. For example, metrics 118 at time 112 show the speeds of objects 114 and 115. These speeds may be calculated for example using the mesh vertices associated with each object. For example, the speed may be calculated as the distance traveled of the centroid of the object's vertices divided by the time interval for the travel. One or more embodiments may calculate any desired metric, including for example, without limitation, speed, velocity, acceleration, angular velocity, angular acceleration, distance traveled, and the count of the number of times an object has performed an action. Metrics may apply for example to individual objects (such as "speed of Jones"), groups of objects ("distance run by the team"), or parts of objects ("angular velocity of Jones' hand"). Metrics may be updated and recalculated at any desired interval or frequency, or as needed, not necessarily at every time or time slice recorded in the 3D environment. In the example shown in FIG. 1, metrics 118 are updated in each of the two subsequent records. In one or more embodiments different metrics may be updated at different intervals or frequencies. In one or more embodiments, one or more metrics may be calculated only when certain events are detected; for example, a speed of a football runner may be calculated only when the runner scores.

3D environment 111 may be stored in store 120. This store may be any type of memory, including for example, without limitation, solid state memory, flash memory, magnetic memory, disk, tape, or any combinations thereof. 3D environment 111 may be stored in any desired format; for example, in one or more embodiments it may be compressed or otherwise processed for storage. In one or more embodiments data on 3D environment 111 may be combined into a single file, for example, which combines the 3D geometry of the mesh with the color data, and which may also include object tags and metrics.

In one or more embodiments, data from 3D environment 111 may be transmitted to a distribution subsystem 121 for distribution to one or more devices. In one or more embodiments the distribution subsystem 121 may be the same as the processing device 110 or may be part of processing device 110. The distribution subsystem may be any system or component, or any collection thereof, that may directly or indirectly access the 3D environment 111 or store 120 and transmit to devices. In one or more embodiments the distribution subsystem 121 may retrieve one or more records from store 120 for distribution. Records may be sent in batch to devices, or may be streamed as a playback stream, for example. In one or more embodiments the distribution subsystem may stream records from 3D environment 111 as they are produced, for example as a "live feed." Distribution subsystem 121 may process the 3D environment 111 prior to transmitting data to devices.

The example shown in FIG. 1 shows two illustrative devices 131 and 132. Devices may be configured to receive data from the distribution subsystem 121 and display this data to one or more users. In one or more embodiments the devices may include for example one or more displays, network interfaces, memories, or processors. Devices may or may not be not be physically integrated. Device components may or may not be collocated. For example, one illustrative device may use a remote external processor to render images for display on a local display. As described below, in one or more embodiments some or all of these devices may be configured to modify a viewpoint from which the 3D environment is viewed, or to make other modifications to the 3D environment (such as inserting an avatar, for example).

In one or more embodiments, distribution subsystem 121 may transmit data derived from 3D environment 111 that matches the characteristics of the receiving devices. For example, for devices with lower resolution, such as device 132, a lower fidelity mesh (or equivalent format) may be transmitted; for devices with higher resolution, such as device 131, a higher fidelity mesh (or equivalent format) may be transmitted. Other modifications and optimizations may be made instead of or in addition to changing the fidelity or size of the mesh. For example, without limitation, for some devices colors may be compressed. Color compression may for example use an indexed color space for low resolution devices, and a full RGB color space for high resolution devices. Color compression for example of a texture image may use lossy compression for low resolution devices, and lossless or no compression for high resolution devices. In one or more embodiments the data transmitted to a device may also depend on the bandwidth of a network connection to the device. For example, lower fidelity data or more compression may be used for devices with limited bandwidth connections. One or more embodiments may use a combination of resolution, bandwidth, or any other characteristics of the receiving device or connection, to determine the data to transmit to the device.

In the example shown in FIG. 1, device 131 initiates transmission from distribution subsystem 121 by sending a request playback (or request live stream) message 133 that contains both the device resolution and the bandwidth of the connection. Message 133 may also include other data, such as an identifier of the 3D environment (for example if multiple 3D environments are available) and a time interval that the device wants to playback if the 3D environment is stored rather than live streamed. Typical features for playback or live streams such as pause, rewind, fast forward, jump, and change playback speed may also be provided via other messages to the distribution system or via capabilities in a device. In one or more embodiments the distribution subsystem 121 may detect either or both of the resolution and bandwidth automatically, instead of or in addition to requiring this information in a request message. In one or more embodiments the device 131 may be registered with the distribution subsystem 121, so that some or all of these characteristics (resolution, bandwidth, and any other relevant factors) may be accessible to the distribution subsystem 121 whenever it starts transmission to the device. Similarly, device 132 sends request playback (or request live stream) message 136 with its resolution and the bandwidth of its connection, or this information is determined by other means as described with respect to device 131. Message 136 may be transmitted at different time or with a different starting time for playback than message 133. The distribution subsystem 121 uses this information 133 and 136 to configure transmissions for each device. In this example, the initial transmission to each device is derived from the same record in 3D environment 111 (the record for time 112), in order to illustrate differences in transmissions based on device and network characteristics. In some situations, the initial record to send to each device may differ; for example, devices may request transmissions at different times or request different time slices for playback. The distribution subsystem 121 may select an initial record for transmission to a device based on any or all of these factors. As illustrated in FIG. 1, mesh 134 sent to high resolution device 131 with a high bandwidth link may be for example the full mesh 113 captured in 3D environment 111; however, mesh 137 sent to low resolution device 132 with a low bandwidth link may be for example a smaller or lower fidelity mesh 137. A lower fidelity mesh 137 may for example omit certain vertices or edges from mesh 113, collapse certain vertices or edges together, or it may reprocess or simplify the mesh 113 in any desired manner to build a different mesh with a smaller size or fidelity. In one or more embodiments the transmission format may not match the storage format in store 120; for example, a mesh data structure may be transformed or compressed in any desired manner for transmission. As illustrated in FIG. 1, colors may also be transmitted with the mesh (or equivalent data). Colors may be sent for example as colors attached to mesh vertices, or as a texture image with texture coordinates attached to mesh vertices as described above. Quality or size of texture images or other color data may be reduced for example for devices such as device 132 with a low resolution or limited bandwidth. Distribution subsystem 121 may also send object identifications and metrics 135 to device 131, and object identifications and metrics 138 to device 132. The object and metric data may vary by device, so that data 135 may not be identical to data 138. In one or more embodiments other optimizations or transformations may be made to accommodate different device resolutions, connection bandwidths, or other characteristics; for example, for a low bandwidth connection, transmissions from distribution subsystem may be sent less frequently.

In one or more embodiments the distribution subsystem 121 may use one or more content distribution networks (CDNs), such as Amazon CloudFront® for example, to distribute data to devices. Embodiments may use any desired protocol or protocols, including for example, without limitation, adaptive HTTP protocols, HTTP live streaming (HLS) and MPEG-DASH. The protocol or protocols used in one or more embodiments may for example support adaptive playback to adapt a stream to device capabilities or networking conditions.

Figure 2:
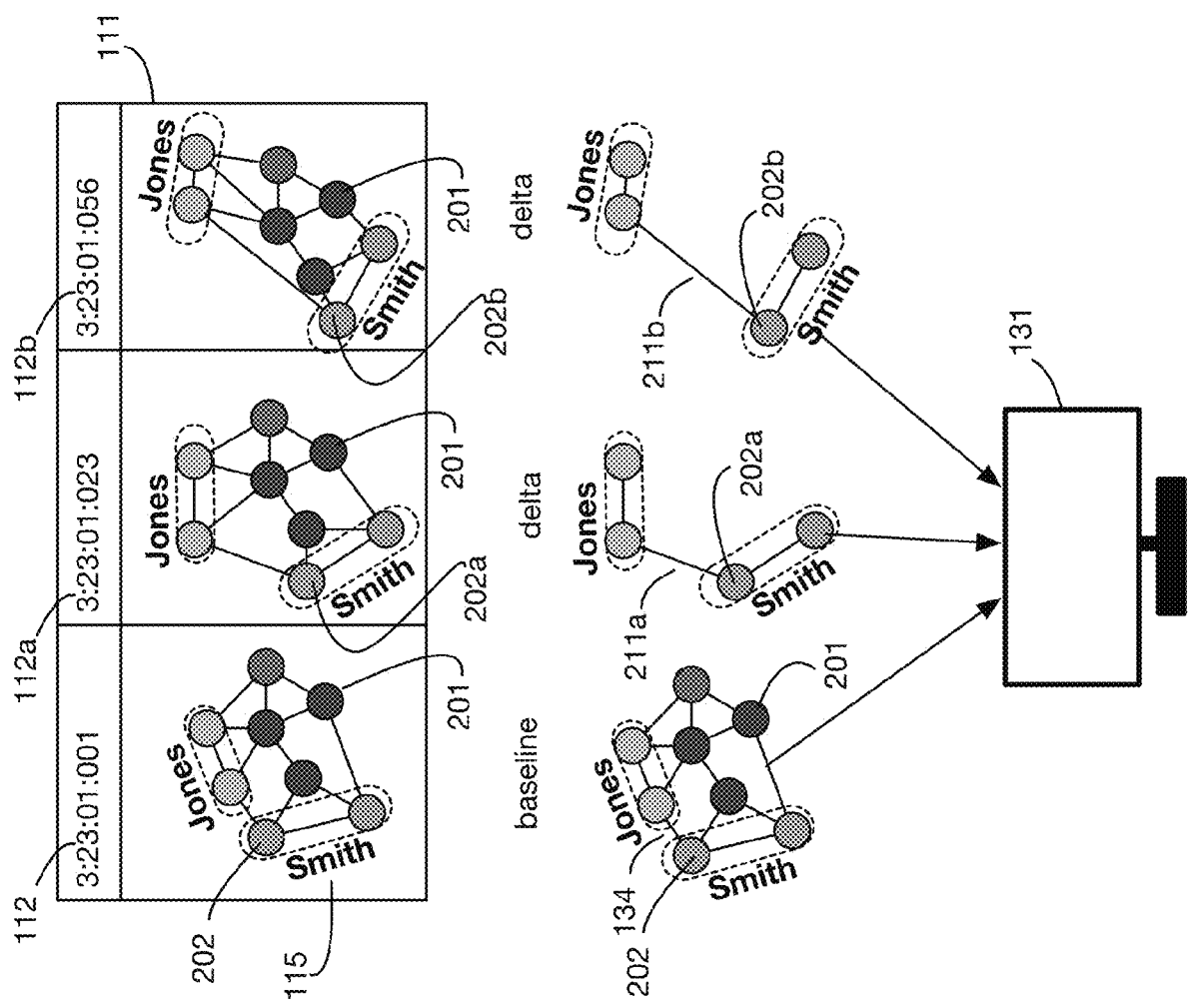
FIG. 2 illustrates transmission of an initial record of a 3D environment, and subsequent transmission of changes only. The transmissions include identifiers of detected objects.

In one or more embodiments, data transmitted after an initial transmission of 3D environment data may include only changes from this original baseline, or changes from some previously sent data. FIG. 2 shows an example of transmission of three records of 3D environment 111 to device 131. At time 112, mesh 134 (along with colors and possibly object identities and locations and metrics) is transmitted to device 131. The distribution subsystem or the processor may determine that some vertices or edges in the mesh of the 3D environment are stationary (or almost stationary) over time; for example, these vertices may represent fixed objects such as a stadium. For example, vertex 201 is stationary in the three records of 3D environment 111 shown in FIG. 2. Vertices that are stationary over a period of time may for example be transmitted only at the beginning of the period in a baseline transmission such as mesh 134. Subsequent transmissions after a baseline transmission may represent deltas from this baseline; for example, transmissions 211a for the record at time 112a and 211b for the record at time 112b. The deltas may for example show only objects or items that are moving, rather than stationary objects or items. In one or more embodiments a stationary vertex may change color over time (for example if lighting conditions change), which may result in a transmission of new color data for the vertex in a delta even if the vertex itself need not be retransmitted. In FIG. 2, vertex 202, which is part of object 115, moves from its location at time 112 to location 202a at time 112a and then to location 202b at time 112b. These vertex location updates 202a and 202b are therefore sent in deltas 211a and 211b, respectively. In one or more embodiments, transmission of deltas relative to a baseline transmission may also be applied to other elements of the data such as colors (including for example texture images), object identifications, and metrics.

Figure 3:
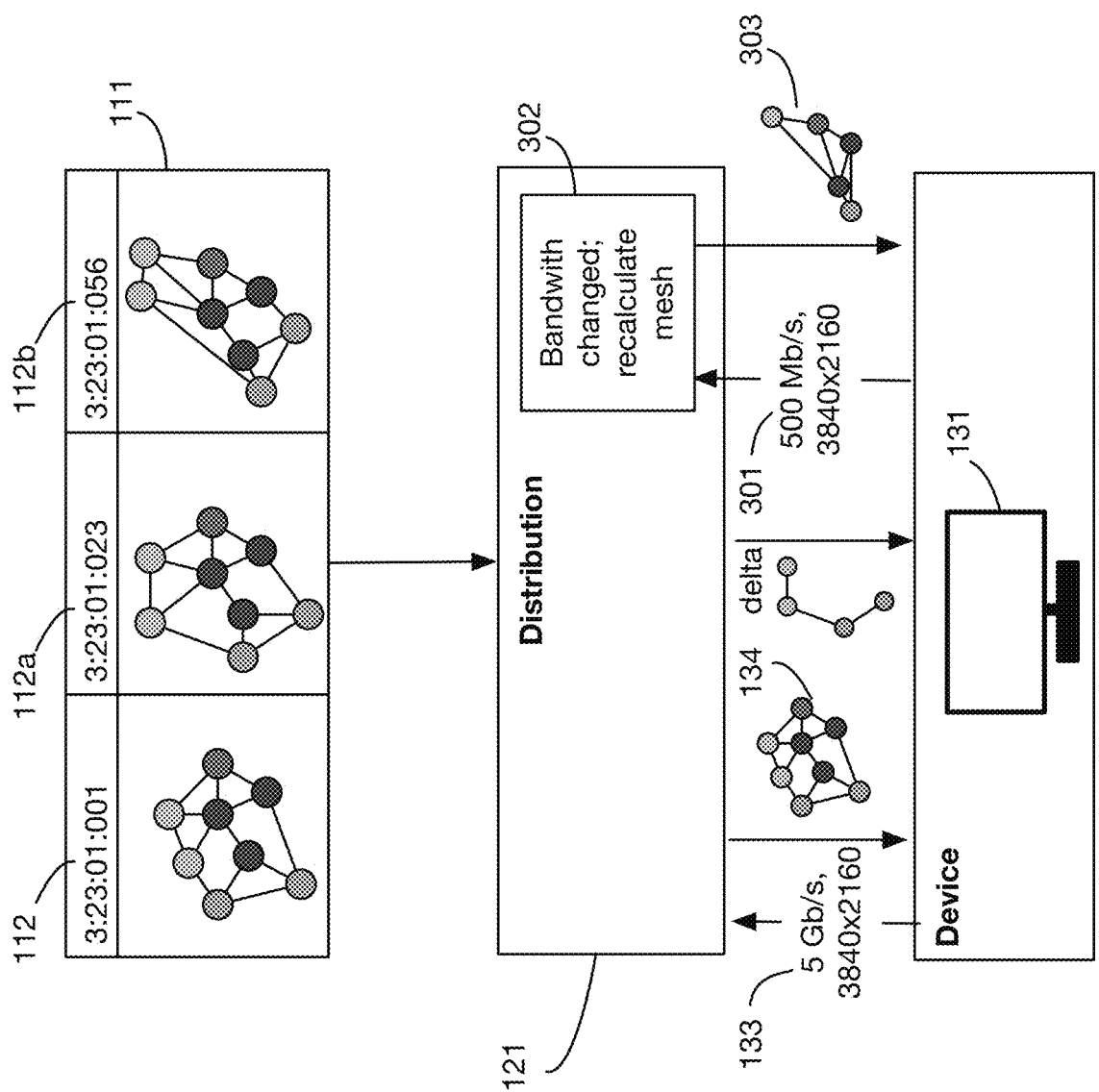
FIG. 3 illustrates re-optimization of the mesh transmitted to a device when the bandwidth of the connection to that device changes.

In one or more embodiments the distribution subsystem may receive or calculate a dynamic update to the bandwidth of a connection to a device, and may modify the data sent to the device accordingly. FIG. 3 shows an example of transmission of data from distribution subsystem 121 to device 131 where a dynamic bandwidth update occurs. (Object identities and metrics are omitted from this example for brevity.) Distribution subsystem 121 first receives request 133, which includes resolution and bandwidth, and transmits baseline mesh 134 derived from 3D environment 111, as described above with respect to FIG. 1. Before transmission of the record at time 112b, the distribution subsystem receives a dynamic bandwidth update 301. This update may for example be transmitted from device 131, from a network router, or from any bandwidth monitoring module including one integrated into distribution subsystem 121. As a result, the distribution subsystem performs calculation 302 to determine a new mesh 303 to transmit. This mesh 303 for example may be smaller or lower fidelity than mesh 134 if bandwidth has been reduced (as in FIG. 3), or larger or higher fidelity if bandwidth has been increased. In one or more embodiments dynamic modifications to transmission size, transmission format, data transmitted, update frequency, or any other parameters may be made in response to changes in any characteristics of the receiving device or of the connection to the device.

Figure 4:
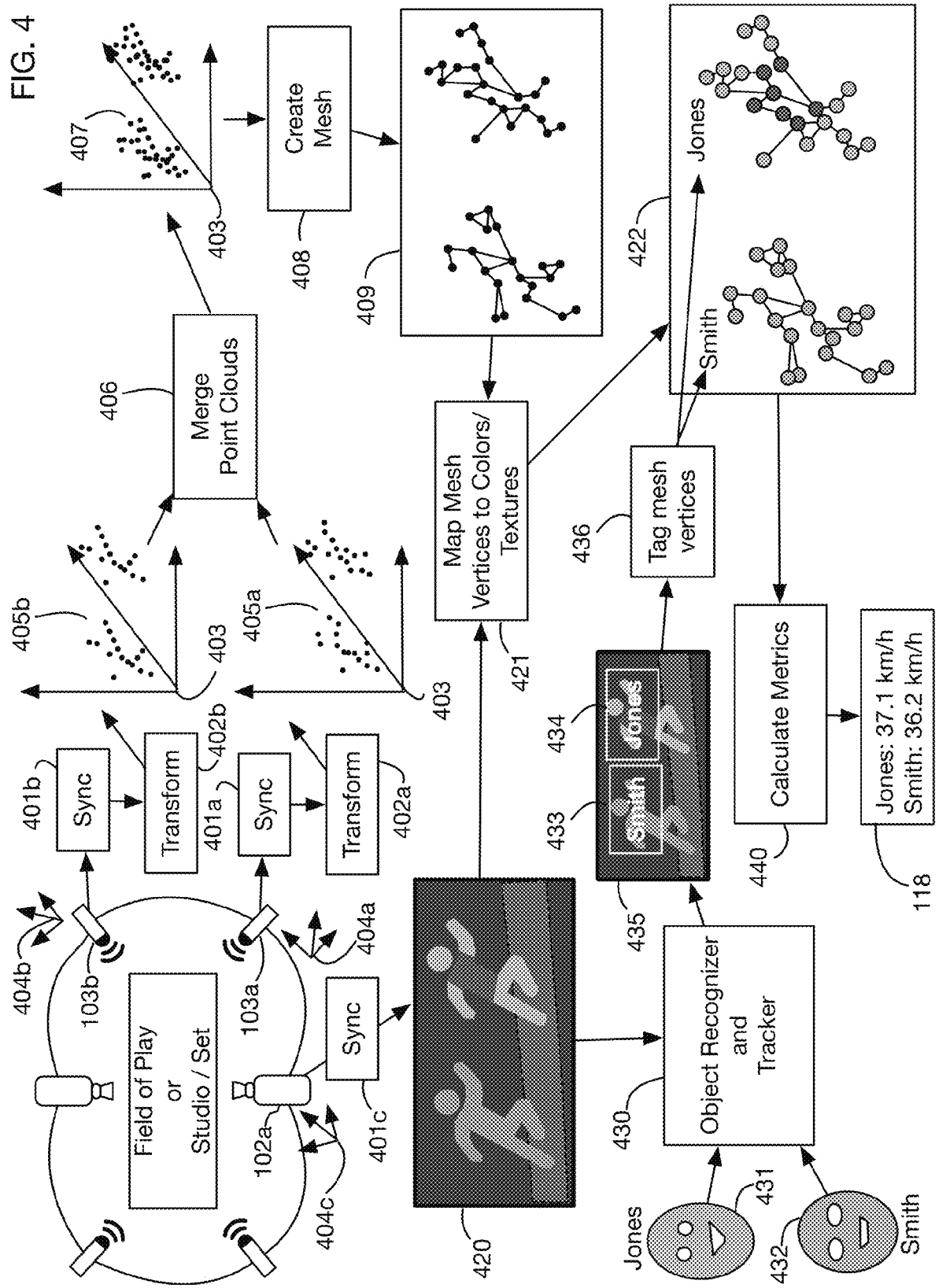
FIG. 4 shows a flowchart of processing steps that may be used in one or more embodiments to create a 3D environment with a mesh, colors, objects, and metrics.

FIG. 4 shows an illustrative series of processing steps that the processor may execute in one or more embodiments to create a 3D environment. These steps are illustrative; one or more embodiments may use different or additional steps or process data in a different order. Additional details that may be used in some of these steps are described below with respect to FIGS. 5A, 5B, and 6. FIG. 4 shows steps for a single record at a specific point in time; the full 3D environment may for example be generated by repeating the steps across time. For ease of illustration, FIG. 4 shows processing of data from only color sensor 102a and depth sensors 103a and 103b; in practice the processor may process data from any or all available sensors.

The first step shown in FIG. 4 is to synchronize in time the data from the sensors, so that the data represents different sensor readings of the area at a common point in time. This synchronization is represented as steps 401a, 401b, and 401c for data from sensors 103a, 103b, and 102a, respectively.

Tracing first the processing of data from the depth sensors 103a and 103b, the next step is transformations 402a and 402b to put depth data from different sensors into a common spatial coordinate system 403. This transformation is a straightforward change of coordinates that uses the location and orientation of the sensors with respect to this common coordinate system 403. For example, the processor may obtain, retrieve or calculate location and orientation 404a of sensor 103a and location and orientation 404b of sensor 103b. This data may for example be determined in a calibration step that determines the relative poses between sensors. The transformed data from sensors 103a and 103b is shown in FIG. 4 as point clouds 405a and 405b, respectively, in common coordinate system 403. In one or more embodiments depth representations other than point clouds may be used; point clouds are shown in FIG. 4 for ease of illustration. Point clouds (and meshes) in FIG. 4 are shown in 2D; in reality these may be 3D objects. Also for ease of illustration, point cloud data is shown only for the moving objects in the scene, and not for the background or stationary items; processing may generally create and process point clouds for any or all items in a scene, including background or stationary items.

The next step 406 shown in FIG. 4 is to merge point clouds 405a and 405b, yielding combined point cloud 407. In one or more embodiments this step may be a simple union of the points from the individual sensors once these points are synchronized in time and transformed to a common spatial coordinate system.

The next step 408 is to create a mesh or other 3D geometry representation from the combined point cloud 407. Algorithms for creating a mesh from depth data such as a 3D point cloud are known in the art; one or more embodiments may employ any of these algorithms. Illustrative algorithms that may be used in one or more embodiments include for example organized fast mesh, marching cubes, Poisson surface reconstruction, scale-space surface reconstruction and moving least squares. Libraries that include meshing algorithm include for example the Computational Geometry Algorithms Library (CGAL) and the Point Cloud Library (PCL).

The meshing algorithm or algorithms employed may depend for example on the type of depth data received from the depth sensors. As an illustrative example, meshing of LIDAR data from a Velodyne PUCK™ (VLP-16) sensor may take advantage of the particular organization of the points from this sensor. The data from the VLP-16 contains 16 scans lines. Each scan line is captured simultaneously, and the data is organized in such a way that points from different scan lines can be matched together. The particular line for each point is captured in the point cloud data and the points for each line are organized in a clockwise fashion. The meshing of the Velodyne data requires matching points on each scan line to create a polygon. Meshing may iterate over the scan line creating triangles between candidate points. A mesh simplification may then be performed to throw out noisy points, thereby improving the quality of the meshes.

The mesh 409 is uncolored, because color data from color sensor 102a has not yet been integrated into the 3D environment. Turning now to the color data, data from color sensor 102a is synchronized in step 401c to the common time scale, as described above with respect to steps 401a and 401b for the depth sensors. Calibration parameters for the sensor 102a, such as camera intrinsic and extrinsic parameters, may be applied to the data as well. Synchronized color data 420, shown in FIG. 4 as a 2D color image such as a frame from a color 2D video camera, is then combined with the mesh 409 in step 421, resulting in a mesh augmented with color 422. This mesh with color 422 is shown in FIG. 4 as a coloring of each vertex; other representation may be used as described above, including for example texture images and texture coordinates for each vertex. An illustrative process for the mapping of mesh vertices to colors/textures 421 is described below with respect to FIG. 6.

Turning now to object detection, in one or more embodiments objects may be detected and tracked using color sensor data 420. One or more embodiments may use mesh data 409 or colored mesh data 422 to detect and track objects instead of or in addition to using color sensor data 420. In the example shown in FIG. 4, objects are detected and tracked using only color sensor data. A potential benefit of this approach is that several effective algorithms for object detection and tracking using color images are known in the art, whereas algorithms for object detection and tracking using 3D geometry data are less well-developed. Image 420 is provided to an object recognizer and tracker 430. This subsystem 430 may for example use a neural network that has been trained to detect and locate certain objects or types of objects in a 2D color image. An illustrative example of a neural network design that recognizes and locates objects in an image is the YOLO (You Only Look Once) system, which may be used in one or more embodiments. In one or more embodiments, object recognition and tracking may be performed fully or partially manually; for example, a neural network may be trained to recognize generic people, and manual input may tag individual people with their identities. Manually generated tags may for example be used to retrain or update a neural network so that subsequent detections may be automated. Objects that may be detected and tracked may include for example generic object categories or specific items such as individual persons. In the example shown in FIG. 4, the object recognizer and tracker 430 may have been trained to recognize two specific individuals using illustrative images 431 and 432. In practice to train a neural network many different images of the individuals or other items may be used. Subsystem 430 may identify these objects and may determine their locations 433 and 434, resulting in a tagged color image 435. It may track these objects and their positions across subsequent images. Using a process similar to the mapping of mesh vertices to colors 421, the tags of object identities associated with pixels in tagged image 435 may then be mapped to the mesh vertices in step 436, to associate vertices of mesh 422 with the identified objects.

The mesh 422 with object tags may then be used in step 440 to calculate one or more metrics, such as metrics 118. The metric calculation 440 may use tagged meshes from different time periods to calculate movement of objects, groups of objects, or parts of objects.

Figure 5A:
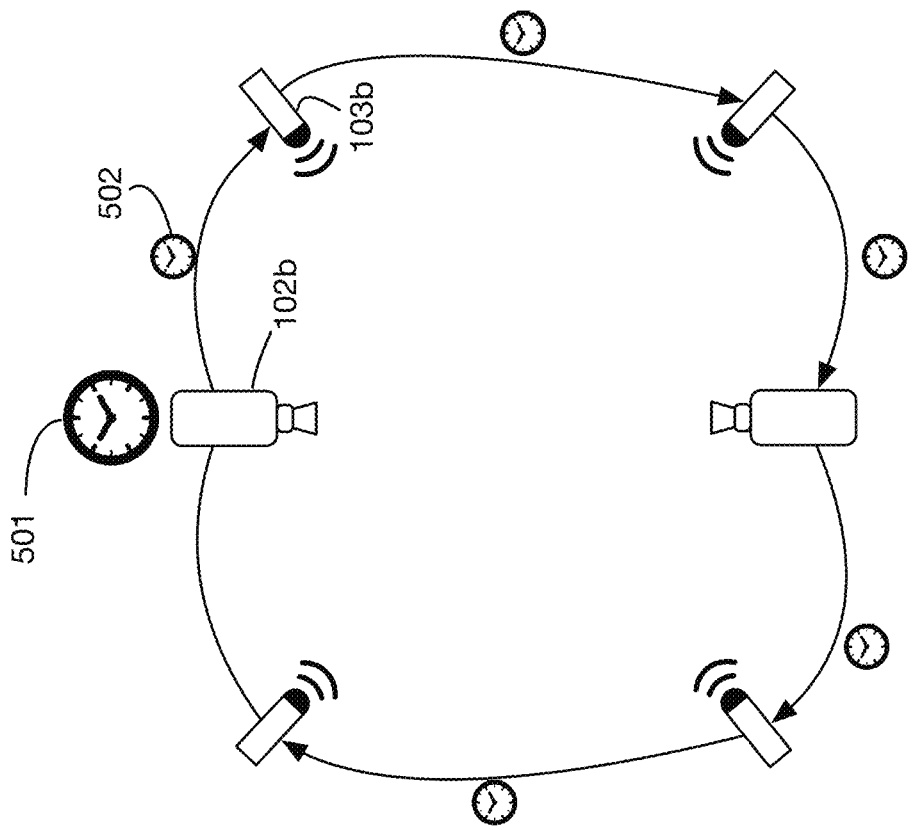
FIG. 5A illustrates an embodiment that synchronizes data from depth and color sensors by synchronizing the sensors to a common clock.
Figure 5B:
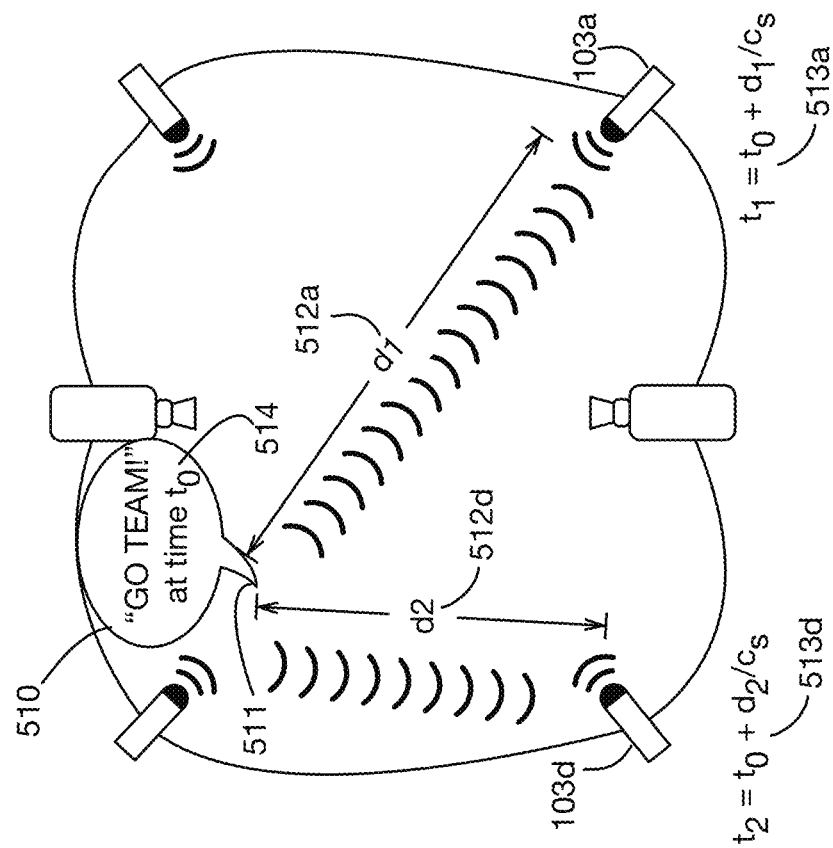
FIG. 5B illustrates an embodiment that synchronizes sensor clocks by detecting a common event, in this case a noise, and correcting for the travel time of sound to each sensor.

FIGS. 5A and 5B show illustrative processes for performing the time synchronization of sensor data, as described with respect to steps 401a, 401b and 401c in FIG. 4. In the embodiment shown in FIG. 5A, each sensor has a clock that is synchronized to a master clock 501. This master clock may be, but need not be, the clock of one of the sensors. Synchronization of clocks may for example use time update messages transmitted from the master clock 501 to all of the sensors. For example, message 502 is shown transmitted from sensor 102b, which holds the master clock 501, to sensor 103b. One or more embodiments may use a protocol such as the Network Time Protocol for example to synchronize sensor clocks to a common time scale.

One or more embodiments may use an external signal generator to synchronize two or more sensors, using for example hardware generator locking ("genlock") capabilities integrated into the sensors.

In the embodiment shown in FIG. 5B, sensor clocks are synchronized based on observation by the different sensors of a common event. This event may be for example any distinguishable or identifiable event that generates a signal that can be detected by the sensors. This signal may be for example optical, audio, electromagnetic, or vibrational. In the embodiment of FIG. 5B, the sensors are equipped with or connected to audio sensors, such as for example microphones. The common event may be for example a distinctive sound that may be generated artificially to synchronize the sensors, or that may occur naturally as the sensors are recording activities. In one or more embodiments, particularly embodiments that record data over large areas, adjustments may be made for the time of travel of the detected signal from the location of the event to each audio sensor. In FIG. 5B, a sound 510 is emitted from a known location 511 at a time 514 (denoted $t_0$). This sound is detected by sensors 103a and 103d, which are equipped with microphones. The distances 512a and 512d between location 511 and sensors 103a and 103d are known, for example by calibrating the location of the sensors relative to location 511. Synchronization of the clocks of sensors 103a and 103d may be performed with calculations 513a and 513d. The calculation $t_i = t_0 + d_i/c_s$ yields the correct time for sensor i at a distance $d_i$ from the event location 511, where $c_s$ is the speed of sound in the area. The time $t_0$ may be set arbitrarily, or it may be determined by detection of the sound by a sensor with a master clock, for example.

Figure 6:
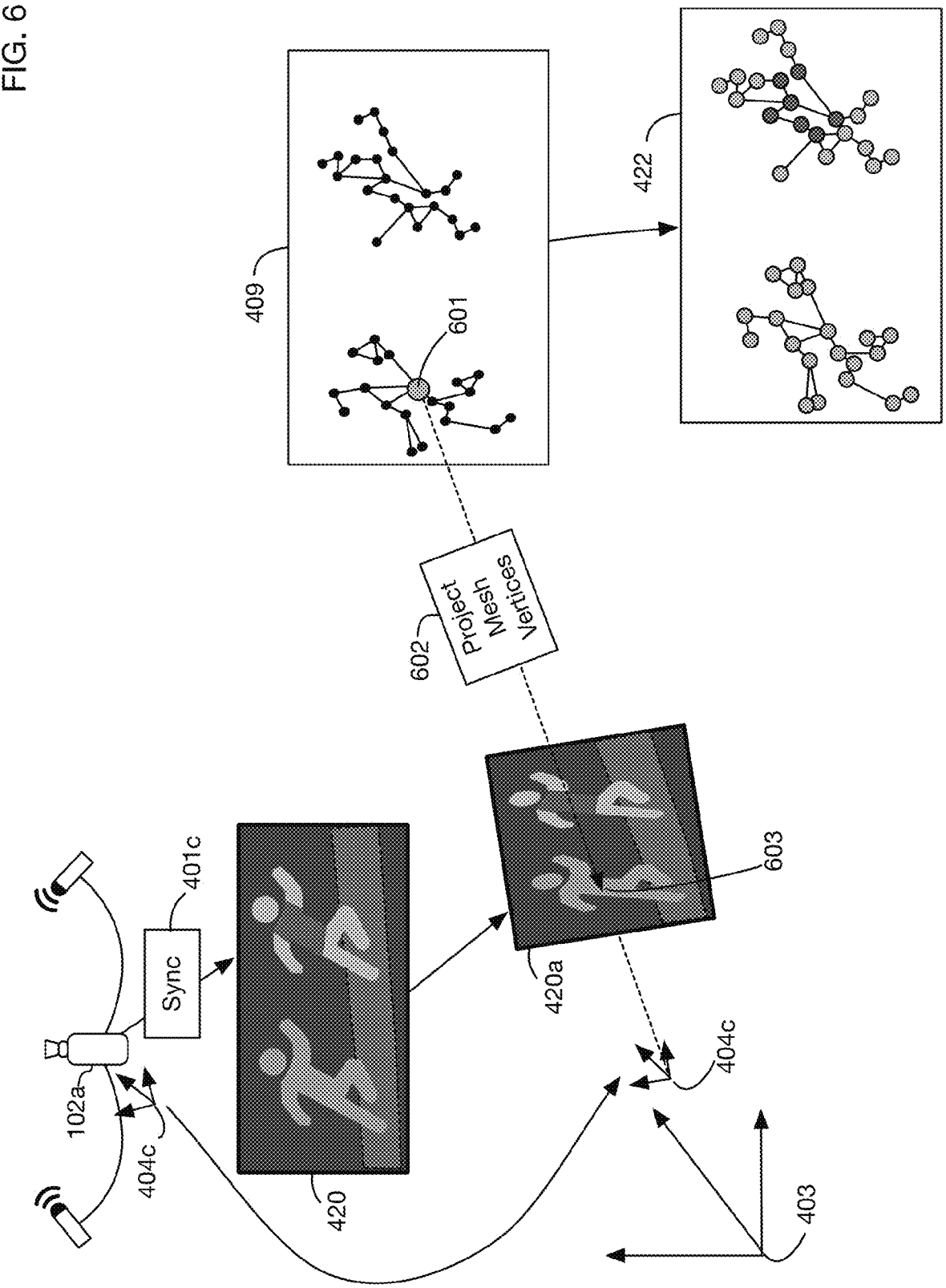
FIG. 6 illustrates a process for coloring the vertices of a 3D mesh that may be used in one or more embodiments; this process projects mesh vertices onto the image plane of a color camera to find each vertex's color.

FIG. 6 shows an illustrative process that may be used in one or more embodiments for mapping of mesh vertices to colors. Mesh 409 is generated from depth data, and time synchronized color image 420 is obtained from color sensor 102a, as described above with respect to FIG. 4. This image may for example be time synchronized with other sensor data and may be adjusted by applying calibration parameters such as camera intrinsic and extrinsic parameters. Mesh 409 does not have associated color data. The location and orientation 404c of sensor 102a with respect to the common coordinate system 403 (in which mesh 409 is represented), along with other sensor parameter such as focal length, determines a projection transformation from points in 3D space in coordinate system 403 onto the image plane 420a of the sensor 102a. A mesh vertex such as vertex 601 may then be projected 602 onto this image plane 420a. The color of the pixel or pixels 603 at or near the location of the projection in the image plane 420a may be used for the color of the vertex 601. This process may be repeated for each vertex in mesh 409, resulting in a colored mesh 422. In one or more embodiments, colors may be represented as a 2D color texture image and as texture coordinates into this image for each mesh vertex. In one or more of these embodiments, the image 420 may be used as the texture image (or as part of the texture image or texture images), and the texture coordinates associated with vertex 601 may be for example the pixel coordinates of pixel 603 in the image.

In one or more embodiments projection of a vertex such as vertex 601 onto image 420a may be blocked due to occlusion by other objects between the vertex and the image 420a. If projection process 602 detects that vertex 601 is occluded in image 420a, then it may not be possible or optimal to obtain the color of this vertex 601 based only on that image. In this scenario, one or more embodiments may use other images from other color sensors to assign a color to the vertex. If no images provide an unoccluded view of a vertex, then in one or more embodiments a color may be assigned for example based on the color of nearby vertices, or based on unoccluded views of the vertex in previous or subsequent frames.

Figure 7:
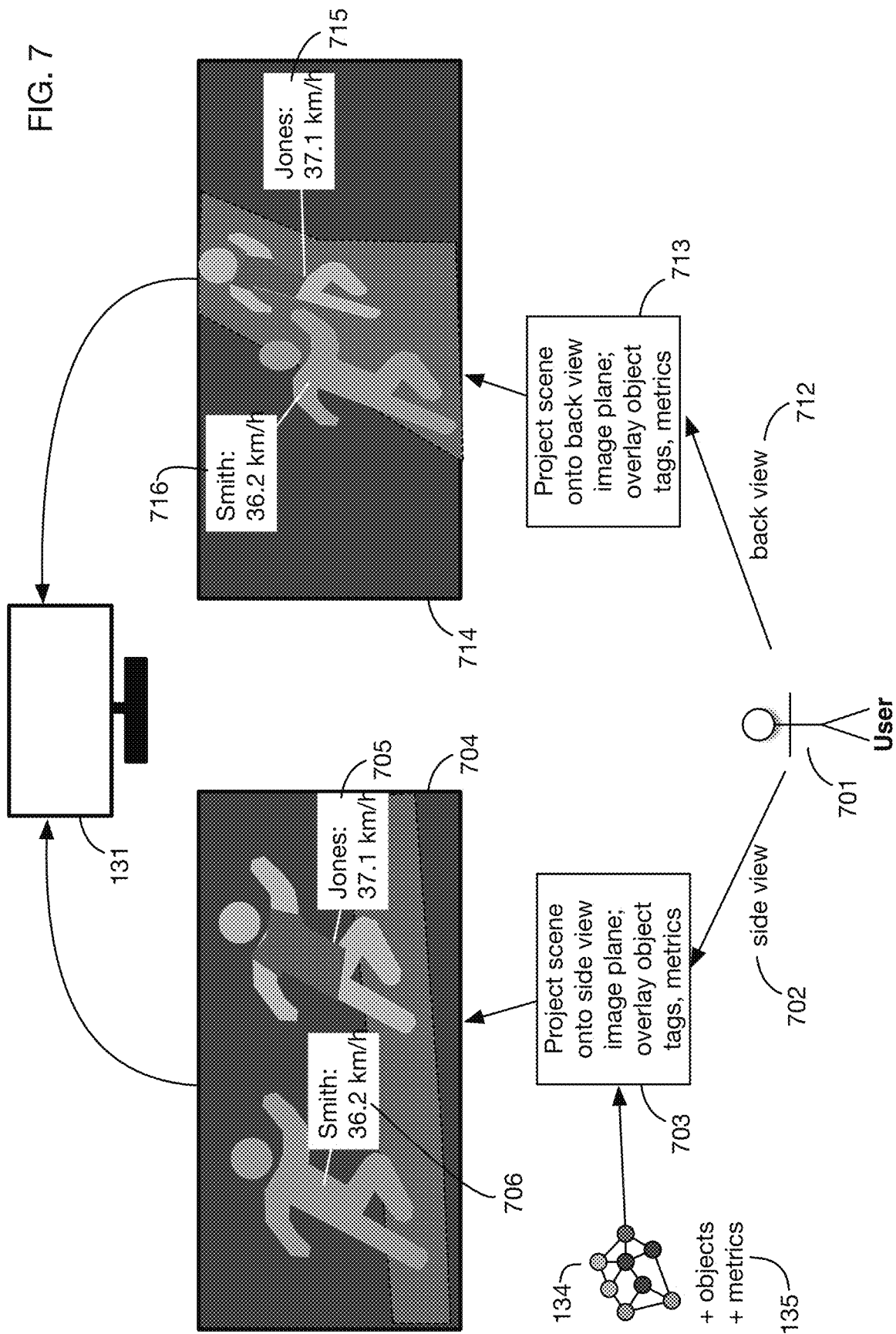
FIG. 7 illustrates an embodiment that enables a device user to select a viewing angle to view the 3D environment.

In one or more embodiments, one or more of the devices receiving data on the 3D environment from the distribution subsystem may be configured to manipulate this data to modify what may be displayed on the device. Because the data includes a three-dimensional representation of the scene, these manipulations may be much more extensive than manipulations typically available with 2D video streams. FIG. 7 illustrates an embodiment that enables a device user to render the 3D environment from any desired angle or viewpoint. User 701 may be for example a viewer of device 131, or a user who controls viewing of device 131 by other users. The device 131 receives mesh and color data 134 and objects and metrics 135 from the distribution subsystem, as described above with respect to FIG. 1. User 701 first selects a side view 702 of the scene. This command results in the device 131 (or another connected processor) executing steps 703 to render an image or a series of images to be displayed on device 131. These steps may for example include rendering of the 3D geometry and colors 134 from the angle 702 to form image 704, and overlaying of object tags and metrics 135 onto the image 704 as overlays 705 and 706. Overlays of object tags or metrics may be in any desired format, including for example text, symbols, icons, graphs, charts, or animations. Rendering may for example use software such as OpenGL®, WebGL®, Direct3D®, or any available or customized system. In one or more embodiments rendering may use hardware acceleration, for example via a GPU integrated into or accessible to device 131. User 701 then selects a back view 712 to view the scene from a different angle. This command results in the device 131 (or another connected processor) executing steps 713 to render an image or a series of images from the new selected angle or viewpoint 712. The 3D geometry and colors contained in 134 may be rerendered to form modified image 714, and object tags and metrics 135 may be inserted the image 714 as overlays 715 and 716. In this example, the overlays associated with each object are located near or on the object, with a line or other symbol connecting the data to the object, making the association clear to the viewer.

User 701 may use any type of control or controls to select viewing angles and viewpoints. Controls may include for example joysticks, game controllers, phones, mice, touchpads, touchscreens, keyboards, or remote controls. Controls may be displayed on the screen of device 131 in one or more embodiments. Controls may present a discrete selection of different viewing angles or viewpoints, or may allow a user to move, zoom, and rotate through the 3D environment. In one or more embodiments the user may move the viewpoint of the image plane to which the scene is rendered to any desired location in the 3D environment, or to any location surrounding the 3D environment. For example, without limitation, in one or more embodiments a user may select a top view from a ceiling or sky, a ground level view, a view within the action of the scene, for example from the perspective of a particular object in the scene, or a view from any seat in a stadium or theater. This capability may for example provide the user and other viewers with an immersive experience, or with the ability to focus on particular aspects of the scene or action that the user is interested in. In sports events, for example, a user, referee, or commentator may be able to replay an action from different viewpoints to determine what actually occurred. This capability may be useful for example for instant replay of controversial plays or penalties. In addition to selecting the location for a view, the user may select an orientation of the view, for example to pan, tilt, and zoom a virtual camera to view selected aspects of the scene or action.

The example shown in FIG. 7 illustrates rendering of 2D images 704 and 714 from the 3D environment 134 and 135. One or more embodiments may support rendering of 3D images, for example stereoscopic images that may be viewed for example on devices that support 3D. In one or more embodiments device 131 may be for example a virtual reality headset, a stereoscopic television, or a 3D movie theater.

Figure 8:
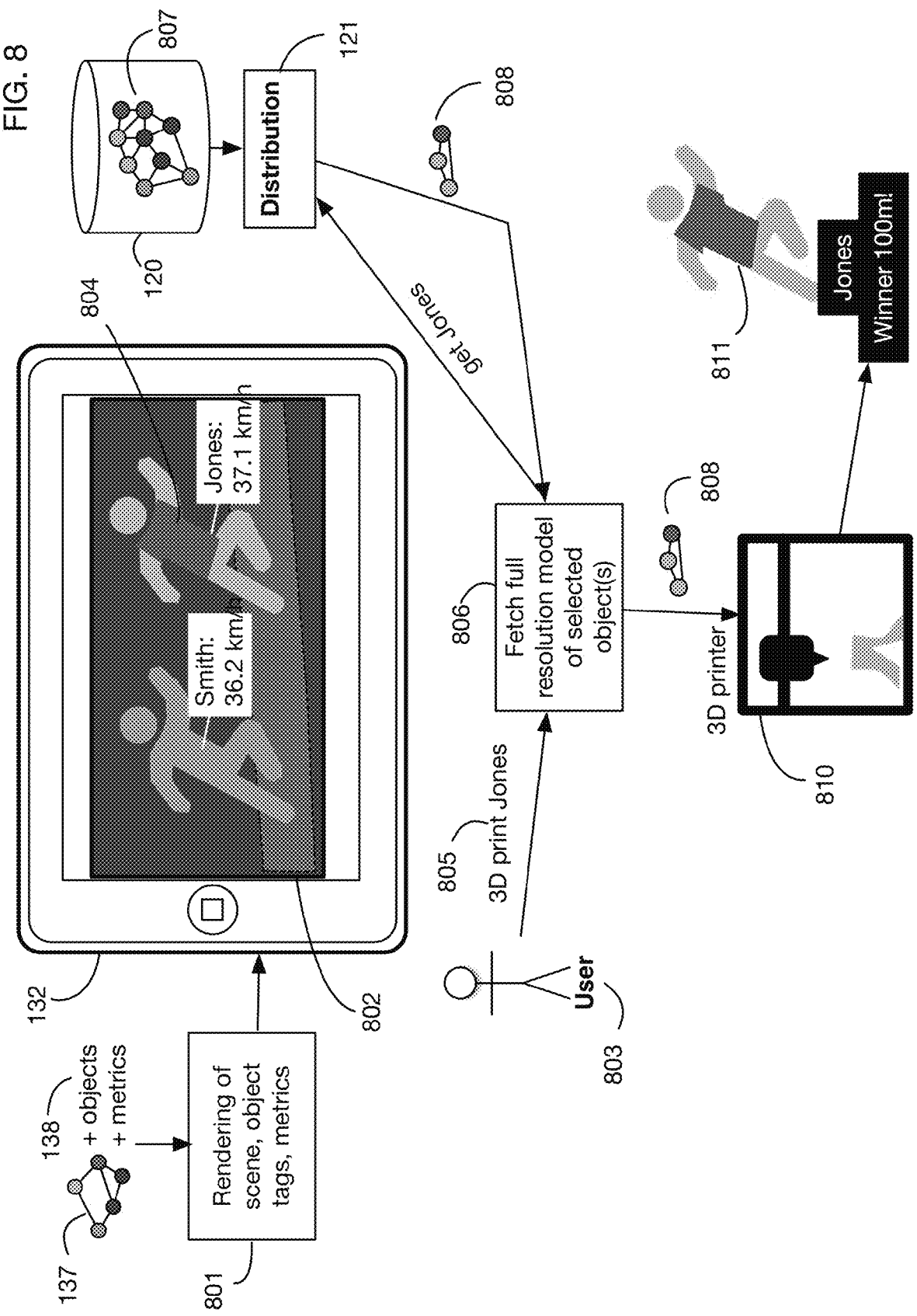
FIG. 8 illustrates an embodiment that enables a device user to 3D-print an object in the 3D environment.

One or more embodiments may provide a capability to 3D-print the 3D environment or one or more objects in this environment. The 3D-printed objects may be used for example as or within memorabilia, mementos, awards, trophies, art, collectables, or educational materials. This capability may be integrated into the viewing device or into any other component that is enabled to receive and process data from the device or the distribution subsystem. FIG. 8 shows an illustrative embodiment that provides a 3D-print capability. Device 132 receives mesh and colors 137 and object tags and metrics 138, and it performs rendering 801 of this data onto device 132 as image 802. User 803 of device 132 determines that he or she wants to print a 3D object to represent object 804 in the scene, so the user issues command 805 to perform 3D printing of the object. In this example, device 132 is a relatively low-resolution device; therefore, the distribution subsystem has transmitted a relatively small or low fidelity mesh 137 to the device. For 3D-printing, either the received mesh 137 may be used or the device or other component may issue a request 806 to the distribution subsystem 121 to obtain a higher fidelity mesh containing the object. The distribution subsystem may access the store 120 to obtain a full mesh 807 of the 3D environment at the time the user wants the 3D printing. The distribution subsystem may transmit this mesh 807 to the device for 3D printing, or it may transmit a subset or transformation 808 of mesh 807 that contains the desired object to 3D-print. Mesh 808 may for example have a higher fidelity, lower compression, larger size, or finer resolution than the corresponding object vertices in the mesh 137. In one or more embodiments the distribution subsystem 121 may send this data 808 directly to a 3D printer. In the embodiment shown in FIG. 8, mesh 808 is sent to the device, which forwards it to 3D printer 810. In one or more embodiments the device, the 3D printer 810, or another system or component may reformat data 808 to a format that is understood by the 3D printer 810.

3D printer 810 generates 3D object 811 representing object 804. In this example, the 3D printer 810 includes color 3D printing capability. In one or more embodiments the 3D printer may create an uncolored object. In one or more embodiments the 3D printer may create an uncolored object, and separate color commands corresponding to data 808 may be sent to one or more other components to color the uncolored object. These components may for example be coloring devices such as painting devices or color inkjet devices. Object 811 also may include other information, such as the object identity, metrics, date and/or time, or any other information that is relevant to the scenario the user wants to memorialize.

Figure 9:
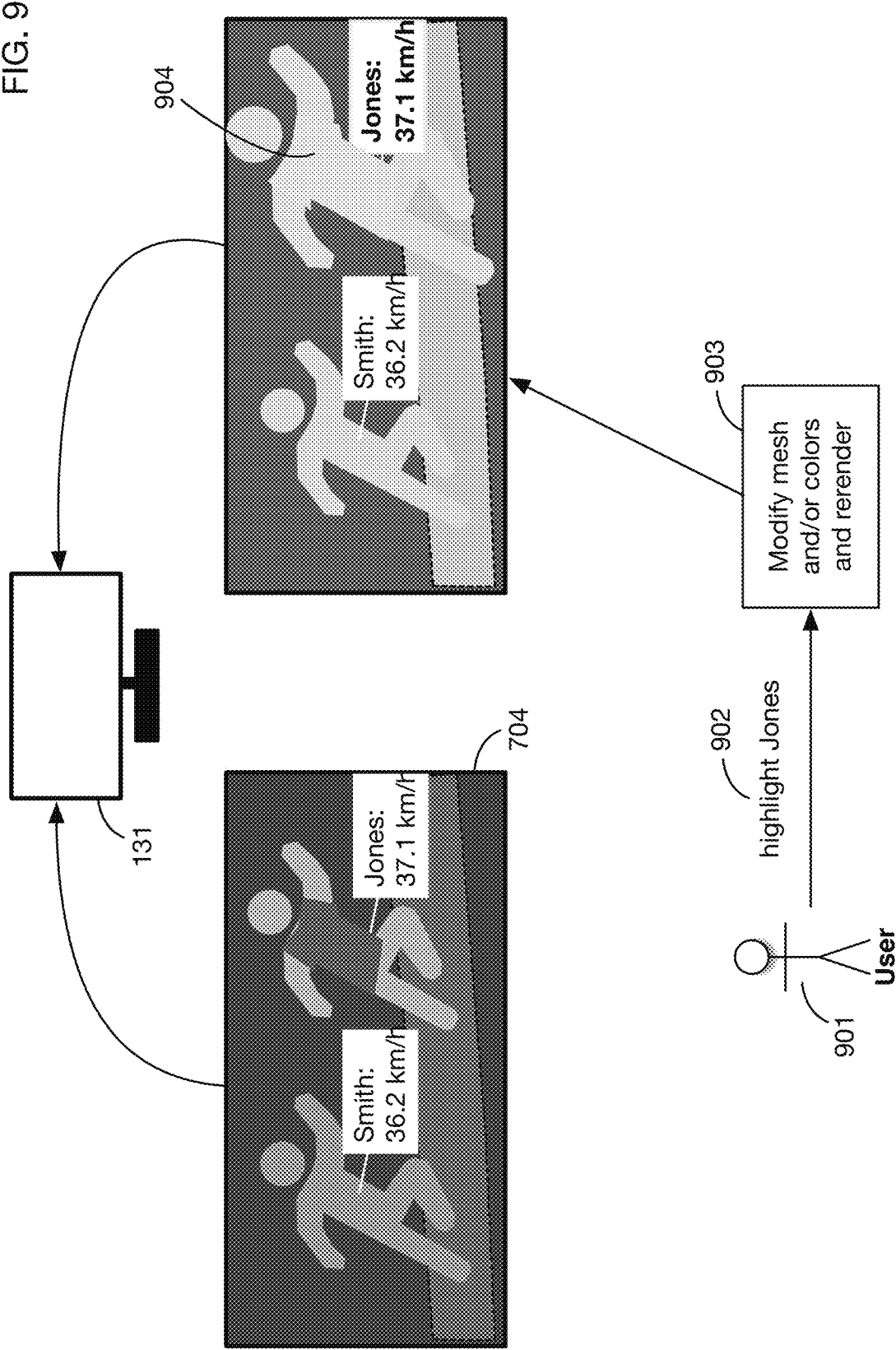
FIG. 9 illustrates an embodiment that enables a device user to highlight an object in the 3D environment.

FIG. 7 above illustrates a capability for a user to change the viewpoint or angle from which a scene is viewed. FIG. 9 shows an illustrative embodiment with another capability to highlight certain objects or to otherwise modify the display of the information about the 3D environment. User 901 of device 131 observes image 704, and issues command 902 to highlight one of the objects in the scene. Because the mesh received by device 131 may have tags showing which vertices are associated with which objects, the rendering engine of the device may modify the appearance of these vertices and potentially of other vertices not associated with the selected object to highlight. One or more embodiments may support any type or types of modifications to highlight objects or otherwise alter the appearance of the scene. For example, without limitation, in one or more embodiments the system may enable hiding of certain objects, adding or subtracting objects, moving of certain objects, rotation of certain objects, changing the size of certain objects, changing the colors of certain objects, placing all or some objects into a different background, or any other modifications. In the example shown in FIG. 9, the modifications 903 to highlight the selected object include changing the colors of the object 904 to be brighter and making the rest of the scene grey. The object 904 is also made larger to further highlight it. In one or more embodiments these modifications or similar modifications may be made by the distribution subsystem or by another other component instead of or in addition to the device. For example, a broadcaster or editor may wish to highlight certain objects as part of a commentary on or replay of an event.

Figure 10:
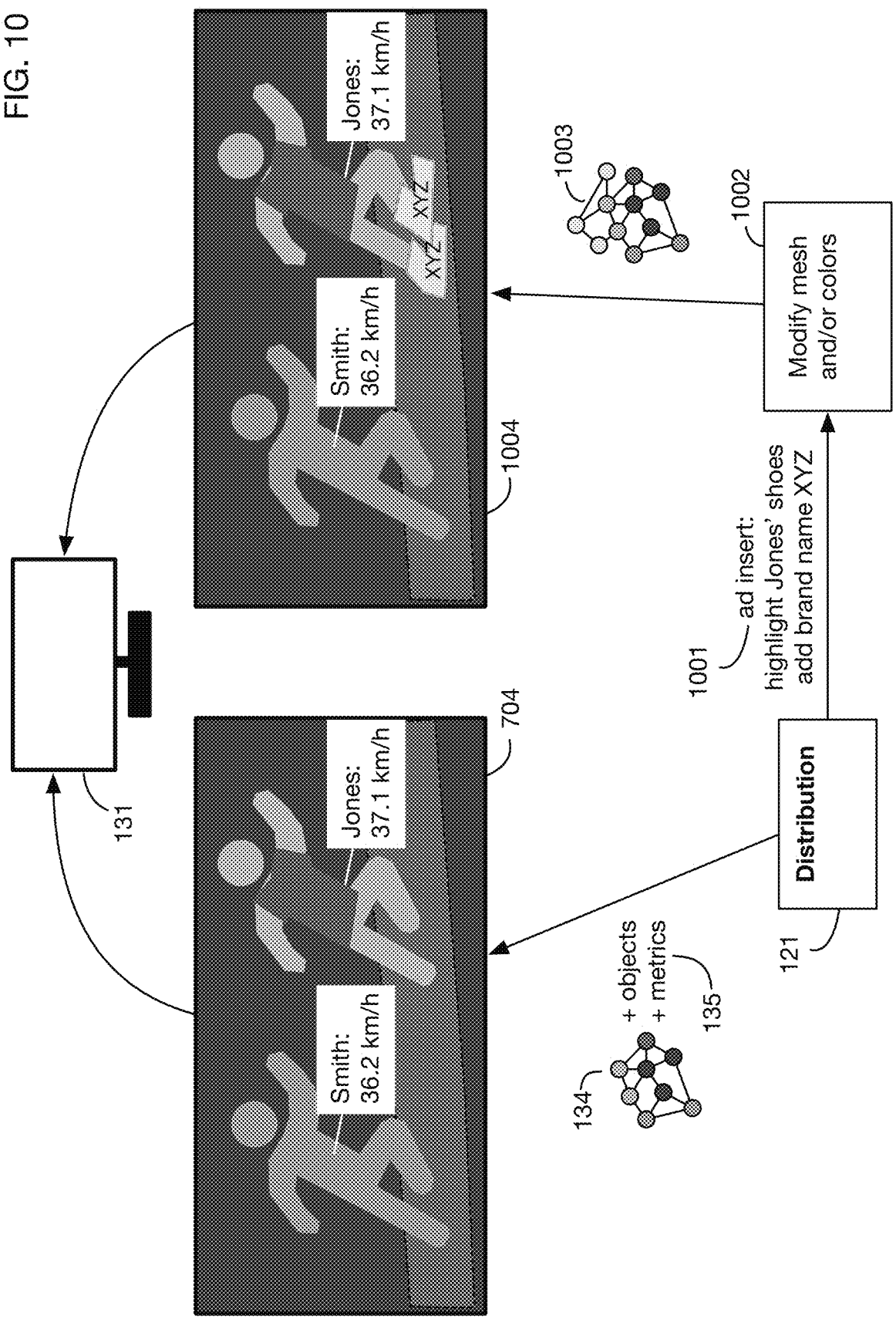
FIG. 10 illustrates an embodiment that modifies the appearance of part of the 3D environment, for example to insert an advertisement.

FIG. 10 shows an illustrative embodiment that may modify the mesh to insert or highlight objects for advertising purposes, for example. In this illustrative example, modifications are made by distribution subsystem 121; in one or more embodiments similar modifications or other modifications may be made by any component, including by the receiving device. Distribution system 121 first sends mesh and colors 134 and objects and metrics 135 to device 131, which renders and displays image 704. Subsequently the distribution system or another system or component issues a command 1001 to insert an advertisement. In this example the advertisement is for shoes, and the advertisement content includes highlighting the shoes of one of the competitors and overlaying the brand name on the shoes. These modifications are illustrative; one or more embodiments may modify the images to display in any desired manner to insert an advertisement or for any other purposes. The distribution subsystem 121 then makes modifications 1002 to the mesh and/or the colors, and transmits the modified mesh and colors 1003 to the device for rendering, resulting in modified image 1004 with the shoes highlighted and labelled. In one or more embodiments the modifications may include making selected items larger than or different from their natural appearance to further highlight them. In one or more embodiments advertisement content or other modification may be customized to individual devices, based for example on user characteristics or actions the user has previously taken.

Figure 11:
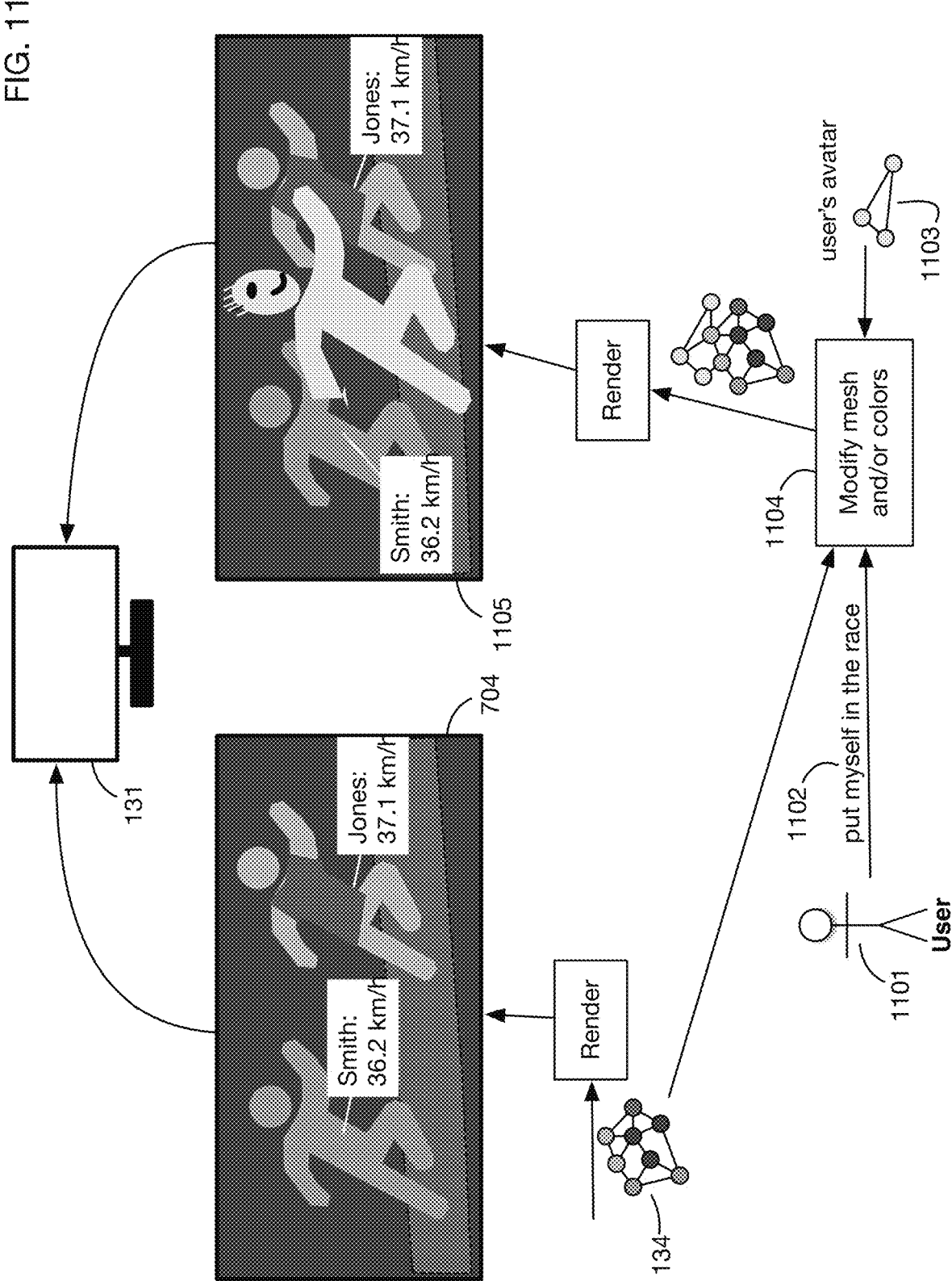
FIG. 11 illustrates an embodiment that allows a device user to add an avatar, for example of the user, into the 3D environment.

FIG. 11 illustrates an embodiment where a user 1101 of a device 131 modifies the 3D environment to insert objects or items. In this example the inserted item is an avatar representing the user. In one or more embodiments inserted or modified objects may be any object, including for example, without limitation, avatars of the user's acquaintances, of celebrities, of players on other teams, of historical figures, or of political figures. The device 131 first renders mesh and colors 134 and displays image 704. The user then issues command 1102 to insert his or her avatar into the scene. The device or another component accesses or obtains a representation 1103 of the user's avatar and makes modifications 1104 to the mesh and colors 134, resulting in modified image 1105 that contains the user's avatar. In one or more embodiments user may for example issue other commands to move, rotate, or otherwise alter the appearance of the avatar or of any other inserted items.

What is claimed is:

1. A dynamic angle viewing system comprising:
   a computer configured to
      obtain depth from a plurality of depth sensors oriented at an area;
      obtain color from a plurality of color sensors oriented at said area;
      synchronize said depth and said color from said plurality of depth sensors and said plurality of color sensors;
      obtain a location and orientation of each of said plurality of depth sensors and a location and orientation of each of said plurality of color sensors;
      merge said depth from said plurality of depth sensors into a combined depth based on said location and orientation of each of said plurality of depth sensors;
      generate a mesh based on said combined depth;
      calculate colors associated with vertices of said mesh based on said color from said plurality of color sensors and based on said location and orientation of each of said plurality of color sensors and based on a projection of said mesh onto one or more image planes associated with said plurality of color sensors;
      create a 3D environment comprising a plurality of records, wherein each record of said plurality of records represents said mesh and said colors associated with vertices of said mesh at a time or time interval associated with said each record;
      store said 3D environment in a memory coupled with said computer;
      receive a request of a first playback of at least a portion of said 3D environment from a first device connected to said computer via a first network connection;
      receive a request of a second playback of at least a portion of said 3D environment from a second device connected to said computer via a second network connection;
      select a first record of said plurality of records for said first playback;
      select a second record of said plurality of records for said second playback;
      calculate a first mesh to transmit to said first device based on
         the mesh corresponding to said first record, and
         one or more characteristics of said first device or of said first network connection;
      calculate a second mesh to transmit to said second device based on
         the mesh corresponding to said second record, and
         one or more characteristics of said second device or of said second network connection;
      transmit said first mesh and a first subset of said color to said first device at a first starting time wherein said first mesh and said first subset of said color may be viewed on said first device without receipt at said computer of a first viewing angle selection from said first device;
      transmit said second mesh and a second subset of said color to said second device at a second starting time wherein said second mesh and said second subset of said color may be viewed on said second device without receipt at said computer of a second viewing angle selection from said second device;

transmit changes to said first mesh to said first device at a time after said first starting time; and, transmit changes to said second mesh to said second device at a time after said second starting time.

2. The dynamic angle viewing system of claim 1, wherein said first device is configured to accept an input from a user to view said first mesh from a different viewing angle;

render said first mesh and said first subset of said color to an image corresponding to said different viewing angle without a communication to said computer;

display said image on said first device.

3. The dynamic angle viewing system of claim 1, wherein at least one of said plurality of depth sensors comprises a LIDAR.

4. The dynamic angle viewing system of claim 1, wherein said plurality of color sensors comprises a plurality of cameras or a plurality of 2D video cameras or at least one 3D camera.

5. The dynamic angle viewing system of claim 1, wherein said computer is further configured to receive a dynamic update to said one or more characteristics of said first device or of said first network connection after said first starting time;

calculate an update to said first mesh based on said dynamic update to said one or more characteristics of said first device or of said first network connection;

transmit said update to said first mesh to said first device.

6. The dynamic angle viewing system of claim 1, wherein said computer is further configured to synchronize said depth and said color from said plurality of depth sensors and said plurality of color sensors based on a common clock.

7. The dynamic angle viewing system of claim 1, wherein said computer is further configured to synchronize said depth and said color from said plurality of depth sensors and said plurality of color sensors based on observations of a common event by said plurality of depth sensors and said plurality of color sensors.

8. The dynamic angle viewing system of claim 7, further comprising a plurality of audio sensors and wherein said common event comprises a sound in said area.

9. The dynamic angle viewing system of claim 8, wherein said computer is further configured to adjust a time of observation of said sound by each of said plurality of audio sensors based on a location of each of said plurality of audio sensors in said area.

10. The dynamic angle viewing system of claim 1, wherein said colors associated with vertices of said mesh comprise one or 2D images representing a texture and texture coordinates associated with each vertex of said vertices of said mesh.

11. The dynamic angle viewing system of claim 1, wherein said computer is further configured to detect one or more objects in said area based on said color from said plurality of color sensors;

assign an object identity to each of said one or more objects;

associate a location in said mesh with each of said one or more objects;

calculate a location in said first mesh of each of said one or more objects based on said location in said mesh;

calculate a location in said second mesh of each of said one or more objects based on said location in said mesh;

transmit said object identity and said location in said first mesh of each of said one or more objects to said first device at said first starting time;

transmit said object identity and said location in said second mesh of each of said one or more objects to said second device at said second starting time;

transmit changes to said location in said first mesh of each of said one or more objects to said first device at said time after said first starting time; and, transmit changes to said location in said second mesh of each of said one or more objects to said second device at said time after said second starting time.

12. The dynamic angle viewing system of claim 11, wherein said first device is configured to accept a request from a user to 3D-print at least one of said one or more objects;

obtain a third mesh containing vertices corresponding to said at least one of said one or more objects;

transmit commands to a 3D printer, said commands corresponding to said third mesh.

13. The dynamic angle viewing system of claim 12 wherein said obtain said third mesh comprises request said third mesh from said computer wherein said third mesh comprises a different fidelity or compression level from said first mesh.

14. The dynamic angle viewing system of claim 12 wherein said first device is further configured to obtain object colors corresponding to said at least one of said one or more objects;

transmit color commands to said 3D printer or to a coloring device, said color commands corresponding to said colors associated with vertices of said third mesh.

15. The dynamic angle viewing system of claim 14, wherein said obtain said object colors comprises request colors associated with vertices of said third mesh from said computer.

16. The dynamic angle viewing system of claim 11, wherein said computer is further configured to calculate a metric associated with at least one of said one or more objects based on said location in said mesh of said at least one of said one or more objects;

transmit said metric to said first device at said first starting time;

transmit said metric to said second device at said second starting time;

transmit changes to said metric to said first device at said time after said first starting time;

transmit changes to said metric to said second device at said time after said second starting time.

17. The dynamic angle viewing system of claim 16, wherein said metric comprises one or more of a speed of said at least one of said one or more objects;

a velocity of said at least one of said one or more objects;

an acceleration of said at least one of said one or more objects;

an angular velocity of said at least one of said one or more objects;

an angular acceleration of said at least one of said one or more objects;

a distance traveled of said at least one of said one or more objects;

a count of a number of times said at least one of said one or more objects has performed an action.

18. The dynamic angle viewing system of claim 16, wherein said first device is further configured to
calculate an image comprising a rendering of said first mesh and said first subset of said color corresponding to a viewing angle selected by a user without a communication to said computer;
overlay said object identity of said at least one of said one or more objects onto said image;
overlay said metric onto said image;
display said image on said first device.

19. The dynamic angle viewing system of claim 18, wherein one or both of said first device and said computer are further configured to modify one or both of said first mesh and said first subset of said color to insert content or highlight content.

20. The dynamic angle viewing system claim 19, wherein said content comprises an object to highlight of said one or more objects.

21. The dynamic angle viewing system of claim 20, wherein said first device is further configured to accept said object to highlight from said user.

22. The dynamic angle viewing system of claim 19, wherein said content corresponds to an advertisement.

23. The dynamic angle viewing system of claim 19, wherein said highlight content comprises change one or more of a size, a shape, and a color of one or more items in said first mesh.

24. The dynamic angle viewing system of claim 19, wherein said content comprises a 3D avatar.

25. The dynamic angle viewing system of claim 24, wherein said 3D avatar represents said user.

26. A dynamic angle viewing system comprising:
a computer configured to
obtain depth from a plurality of depth sensors oriented at an area;
obtain color from a plurality of color sensors oriented at said area;
synchronize said depth and said color from said plurality of depth sensors and said plurality of color sensors;
obtain a location and orientation of each of said plurality of depth sensors and a location and orientation of each of said plurality of color sensors;
merge said depth from said plurality of depth sensors into a combined depth based on said location and orientation of each of said plurality of depth sensors;
generate a mesh based on said combined depth;
calculate colors associated with vertices of said mesh based on said color from said plurality of color sensors and based on said location and orientation of each of said plurality of color sensors and based on a projection of said mesh onto one or more image planes associated with said plurality of color sensors;
create a 3D environment comprising a plurality of records, wherein each record of said plurality of records represents said mesh and said colors associated with vertices of said mesh at a time or time interval associated with said each record;
store said 3D environment in a memory coupled with said computer;
receive a request of a first playback of at least a portion of said 3D environment from a first device connected to said computer via a first network connection;
receive a request of a second playback of at least a portion of said 3D environment from a second device connected to said computer via a second network connection;
select a first record of said plurality of records for said first playback;
select a second record of said plurality of records for said second playback;
calculate a first mesh to transmit to said first device based on
the mesh corresponding to said first record, and
one or more characteristics of said first device or of said first network connection;
calculate a second mesh to transmit to said second device based on
the mesh corresponding to said second record, and
one or more characteristics of said second device or of said second network connection;
transmit said first mesh and a first subset of said color to said first device at a first starting time wherein said first mesh and said first subset of said color may be viewed on said first device without receipt at said computer of a first viewing angle selection from said first device;
transmit said second mesh and a second subset of said color to said second device at a second starting time wherein said second mesh and said second subset of said color may be viewed on said second device without receipt at said computer of a second viewing angle selection from said second device;
transmit changes to said first mesh to said first device at a time after said first starting time;
transmit changes to said second mesh to said second device at a time after said second starting time;
detect one or more objects in said area based on said color from said plurality of color sensors;
assign an object identity to each of said one or more objects;
associate a location in said mesh with each of said one or more objects;
calculate a location in said first mesh of each of said one or more objects based on said location in said mesh;
calculate a location in said second mesh of each of said one or more objects based on said location in said mesh;
transmit said object identity and said location in said first mesh of each of said one or more objects to said first device at said first starting time;
transmit said object identity and said location in said second mesh of each of said one or more objects to said second device at said second starting time;
transmit changes to said location in said first mesh of each of said one or more objects to said first device at said time after said first starting time;
transmit changes to said location in said second mesh of each of said one or more objects to said second device at said time after said second starting time;
calculate a metric associated with at least one of said one or more objects based on said location in said mesh of said at least one of said one or more objects;
transmit said metric to said first device at said first starting time;
transmit said metric to said second device at said second starting time;
transmit changes to said metric to said first device at said time after said first starting time; and,
transmit changes to said metric to said second device at said time after said second starting time;
wherein said first device is configured to calculate an image comprising a rendering of said first mesh and said first subset of said color corresponding to a viewing angle selected by a user without a communication to said computer;

overlay said object identity of said at least one of said one or more objects onto said image;

overlay said metric onto said image; and, display said image on said first device.

27. The dynamic angle viewing system of claim 26, wherein said first device is further configured to accept a request from said user to 3D-print at least one of said one or more objects;

request a third mesh containing vertices correspond to said at least one of said one or more objects from said computer wherein said third mesh comprises a different fidelity or compression level from said first mesh;

transmit commands to a 3D printer, said commands corresponding to said third mesh;

request colors associated with vertices of said third mesh from said computer;

transmit color commands to said 3D printer or to a coloring device, said color commands corresponding to said colors associated with vertices of said third mesh.

* * * * *